(12) United States Patent
Kubo (10) Patent No.: US 6,279,053 B1
(45) Date of Patent: Aug. 21, 2001

(54) APPARATUS FOR TRANSMITTING KEY-IN DATA AND VIDEO DATA IN ONE PACKET IN REAL TIME VIA USB INTERFACE

(75) Inventor: Shinya Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/181,637

(22) Filed: Oct. 29, 1998

(30) Foreign Application Priority Data

Oct. 30, 1997 (JP) ................................................ 9-299081

(51) Int. Cl.[7] .............................. G06F 3/00; G06F 13/12; G06F 13/38
(52) U.S. Cl. .................... 710/30; 710/5; 710/30; 710/67
(58) Field of Search .............................. 710/3, 5, 20, 21, 710/30, 61, 65, 67, 35; 348/207, 231

(56) References Cited

U.S. PATENT DOCUMENTS

| | | | |
|---|---|---|---|
| 4,533,949 | * 8/1985 | Fujimura et al. | 380/5 |
| 5,508,736 | * 4/1996 | Cooper | 348/144 |
| 5,550,966 | * 8/1996 | Drake et al. | 707/104 |
| 5,572,728 | * 11/1996 | Tada et al. | 707/200 |
| 5,583,577 | * 12/1996 | Tsukagoshi | 348/468 |
| 5,841,471 | * 11/1998 | Endsley et al. | 348/231 |
| 5,877,781 | * 3/1999 | Tomizawa et al. | 345/521 |
| 5,883,675 | * 3/1999 | Herz et al. | 348/465 |
| 5,958,020 | * 9/1999 | Evoy et al. | 710/3 |
| 5,969,750 | * 10/1999 | Hsieh et al. | 348/15 |
| 5,974,486 | * 10/1999 | Siddappa | 710/53 |
| 6,005,613 | * 12/1999 | Endsley et al. | 348/231 |
| 6,075,563 | * 6/2000 | Hung | 348/223 |
| 6,101,274 | * 8/2000 | Pizano et al. | 382/176 |

FOREIGN PATENT DOCUMENTS

355076439A * 6/1980 (JP) .
7-111628   4/1995 (JP) .
8-214258   8/1996 (JP) .

* cited by examiner

*Primary Examiner*—Thomas Lee
*Assistant Examiner*—Chun Cao
(74) *Attorney, Agent, or Firm*—Foley & Lardner

(57) ABSTRACT

The present invention provides a video data reading method comprising steps of: inputting a video data from a video input device; inputting a key-in data from a key switch; adding said key-in data to a packet of said video data; and transmitting said video data and said key-in data in the same packet via a USB interface to a host computer.

6 Claims, 6 Drawing Sheets

APPARATUS FOR TRANSMITTING KEY-IN DATA AND VIDEO DATA IN ONE PACKET IN REAL TIME VIA USB INTERFACE

BACKGROUND OF THE INVENTION

1. Field of the Invention

The present invention relates to a video data reading apparatus using a USB (universal serial bus) interface such as a video data reading apparatus of a PC camera for successively reading a moving picture and transmitting the moving picture via a USB interface to a personal computer.

2. Description of the Related Art

The USB interface was proposed in 1996 and began to be loaded on a personal computer in 1997. The USB interface itself is a new technique and there has been no video data reading apparatus using the USB interface.

It is possible to consider a PC camera employing the conventional PC camera technique and the USB specification as a PC camera having: video input means for inputting a video data; key input means for entering a key-in data; and data output means for transmitting the video data and the key-in data via a USB interface to a personal computer.

In this PC camera, a key-in data end point is provided separately from a video data end point so that when a key switch is depressed, the key-in data end point is used so as to transmit the key-in data without synchronization with the video data.

However, such a configuration has a problem as follows.

(1) To provide an end point in a USB interface logic circuit mounted on a PC camera, it is necessary to provide a large-scale circuit having a number of registers and gates such as FIFO. If another end point is to be provided for a key-in data transmission, the PC camera circuit size is further increased, which in turn increases production costs.

(2) Each end point data transfer requires a predetermined transmission time according to the USB specification including an overhead. Moreover, a key-in data is transferred in a packet separately from a video data transfer by way of interrupt transfer or isochronous transfer (hereinafter, referred to as ISO transfer) defined in the USB specification. When transmitting this key-in data, it is necessary to use a predetermined band width separately from the video data transfer, including the overhead required for transmission. Thus, while transmitting a key-in data, it is impossible to transfer a video data. This significantly lowers the video data transfer rate.

As has been described above, according to the prior art, there are problems that (1) the PC camera circuit configuration becomes complicated and increases its size and (2) the video data transfer rate is lowered when transmitting a key-in data.

SUMMARY OF THE INVENTION

It is therefore an object of the present invention to provide a video data reading apparatus capable of transmitting a key-in data from a key switch provided on a PC camera or the like at a real time to a host computer without complicating or increasing the size of the circuit configuration of a PC camera or the like and without lowering the video data transfer rate.

In order to achieve the aforementioned object, the video data reading method according to the present invention comprises steps of: inputting a video data from a video input device; inputting a key-in data from a key switch; adding the key-in data to the video data in one packet; and transmitting the video data and the key-in data via a USB interface to a host computer. According to another aspect of the present invention, there is provided a video data reading apparatus comprising: video input means for inputting a video data; key-in means for inputting a key-in data; and data output means for adding the key-in data inputted by the key-in means into a packet of the video data inputted by the video input means, so that the video data and the key-in data are transferred via a USB interface to a host computer.

According to the present invention, there is no need of providing a separate end point for a key-in data. This suppresses increase of the circuit size. Furthermore, because a key-in data is added into a packet of a video data for transmission, there is no increase in transfer overhead excluding the video data and accordingly, there is almost no lowering in the video data transfer rate.

DESCRIPTION OF THE PREFERRED EMBODIMENTS

Hereinafter, description will be directed to preferred embodiments with reference to the attached drawings.

Figure 1:
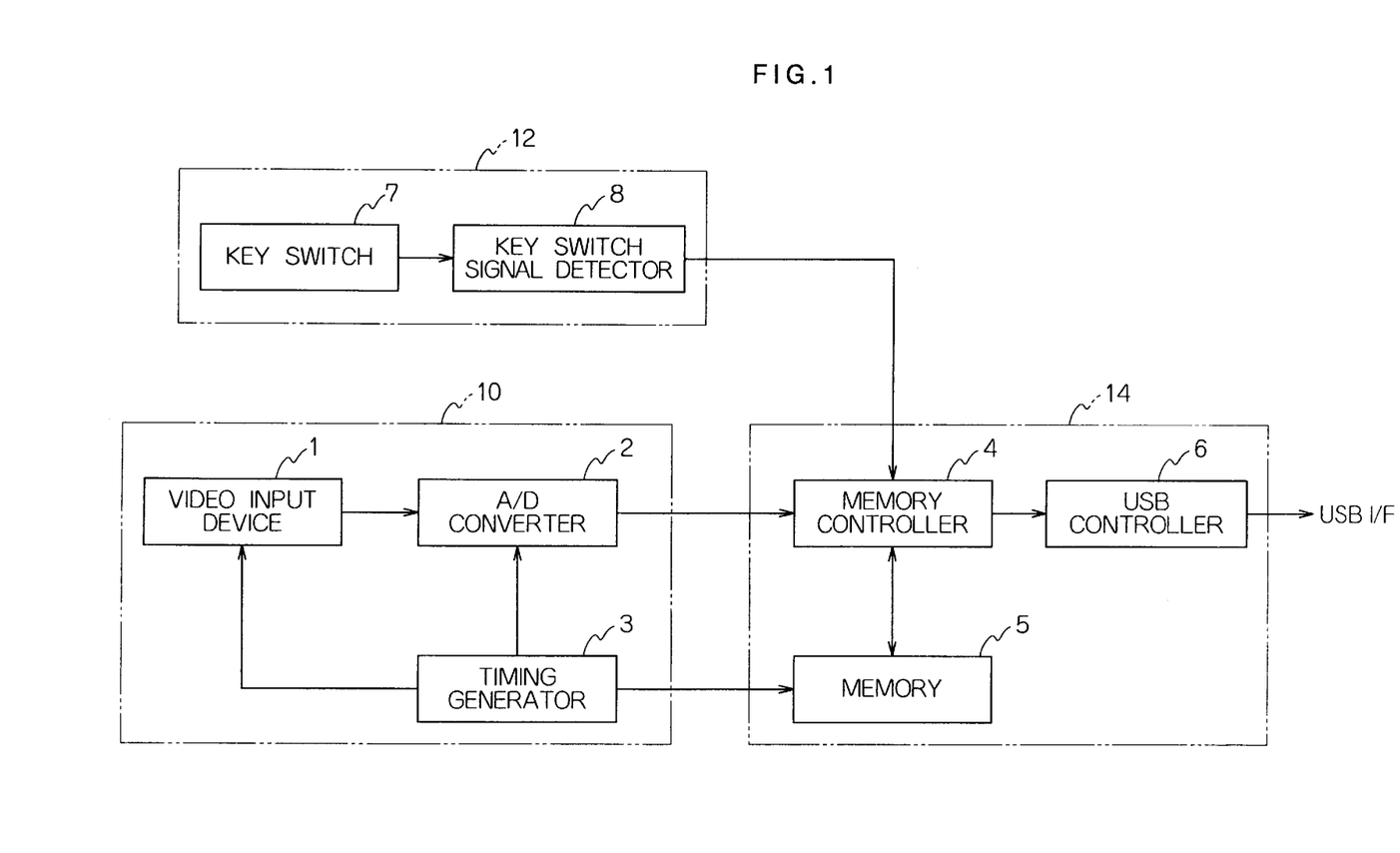
FIG. 1 is a block diagram showing a video data reading apparatus according to an embodiment of the present invention.

FIG. 1 is a block diagram showing a video data reading apparatus according to a first embodiment of the present invention. In this embodiment, the video data reading apparatus is a PC camera.

The PC camera according to the first embodiment comprises: video input means 10 for inputting a video data; key-in means 12 for inputting a key-in data; and data output means 14 for adding the key-in data entered by the key-in means 12, to a packet containing the video data entered by the video input means 10 so that the video data and the key-in data are transferred via a USB interface (I/F) to a host computer (not depicted). The host computer is a microcomputer, for example.

The video input means 10 includes: a video input device 1 for reading a moving picture and outputting the moving picture as an analog video signal; a timing generator 3 for controlling drive of the video input device 1; and an A/D converter 2 for converting the analog video signal into a digital video signal of a video data.

The key-in means 12 includes: a key switch 7 for inputting a signal for operation and a data input; and a key switch signal detector 8 for converting the signal inputted by the key switch 7, into a key-in data of a pulse having a predetermined length.

The data output means 14 includes: a memory 5 for accumulating a video data; a memory controller 4 for controlling a video data read-out and write-in from/to the memory 5 and adding a key-in data to a video data for output; and a USB controller 6 for transmitting the video data and the key-in data from the memory controller 4 as the same packet via a USB interface to the host computer.

The video input device 1 is a CCD or the like for example. The memory controller 4 performs a video data write-in and read-out into/from the memory 5 and assigns the key-in data from the key switch signal detector 8 to a predetermined data bit so as to be added to the video data. The key switch signal detector 8 converts a key switch signal generated by depression of the key switch 7, into a key-in data of a pulse having a predetermined width and transmits the key-in data to the memory controller 4.

Next, explanation will be given on the operation of the PC camera according to the first embodiment with reference to FIG. 1.

Firstly, the timing generator 3 generates a control signal, according to which an analog video signal is successively read by the video input device 1. The analog video signal is then converted by the A/D converter 2 into a video data of a digital video signal. This video data is written into the memory 5 by the memory controller 4. The video data written into the memory 5 is read out to the memory controller 4 according to the control signal from the USE controller 6 and then transmitted to the USB controller 6. This video data is transmitted by the USB controller 6 via the USB interface to the host computer.

An input signal generated by depression of the key switch 7 is converted by the key switch signal detector 8 into a key-in data of a pulse having a predetermined width. This key-in data is transmitted to the memory controller 4 and added to the video data so as to be written into the memory 5. Thus, the key-in data is added at real time to the video data and transmitted via the USB interface to the host computer.

Figure 2:
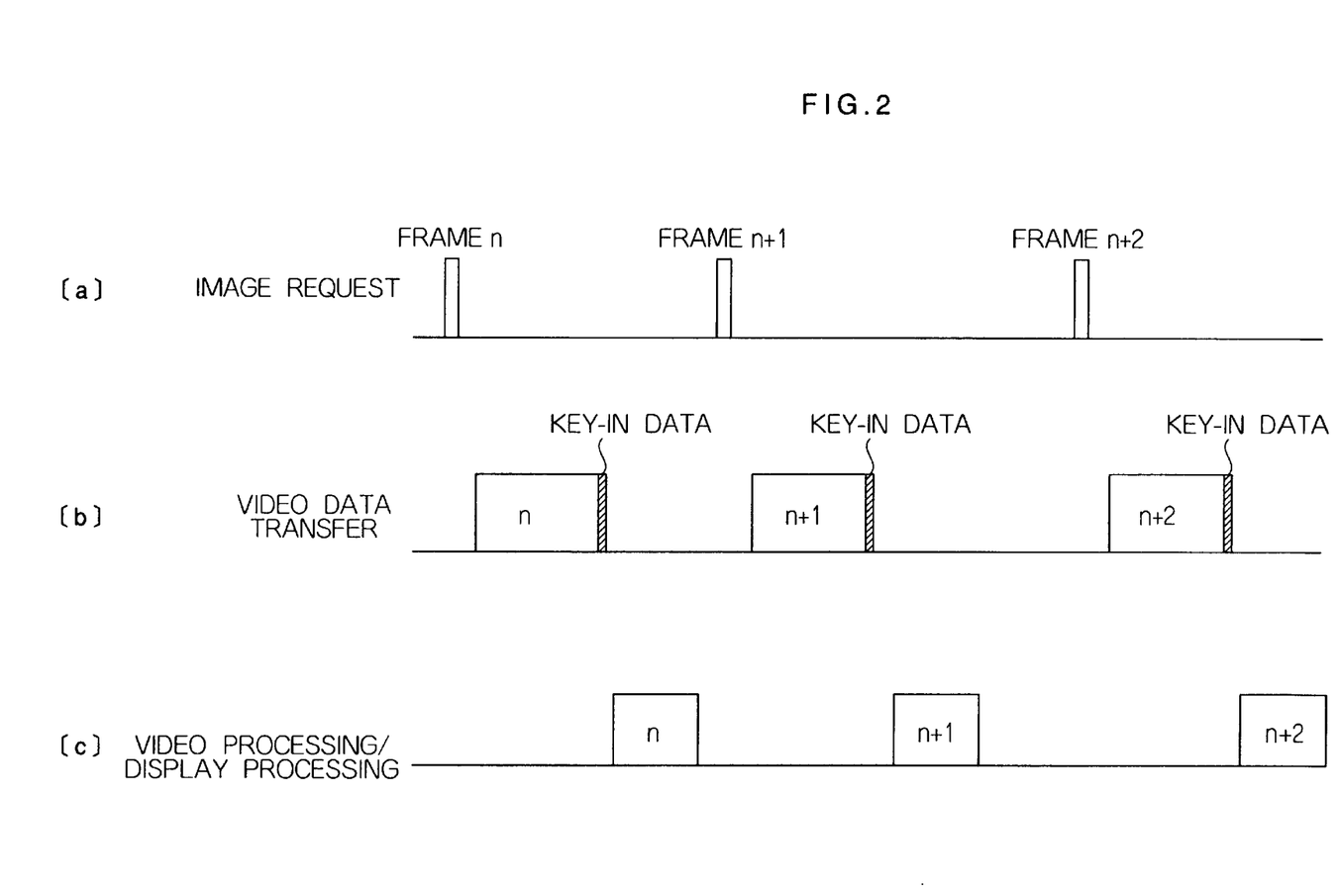
FIG. 2 is a timing chart showing a PC camera operation in a first specific example of the first embodiment of FIG. 1.

FIG. 2 is a timing chart showing a PC camera operation in a first specific example of the present embodiment. Hereinafter, the PC camera operation will be detailed with reference to FIG. 1 and FIG. 2.

Various methods can be considered for transmitting a video data from the PC camera to the host computer. In the present example, a video data is transferred while providing synchronization between the PC camera and the host computer as follows. Firstly, for each transfer of one screen data, an image request is transmitted from the host computer to the PC camera by way of control transfer defined by the USB specification. When the image request is received by the PC camera, a video data is successively transferred to he host computer by way of ISO transfer.

As shown in FIG. 2, when an n-th frame image request is transmitted from the host computer (in FIG. 2A), transmission of one screen video data from the PC camera is started (FIG. 2B). When the one screen video data transmission is complete, the host computer starts video processing and display processing of the received video data (FIG. 2C). When display of the one screen video data is complete, the host computer transmits to the PC camera an image request of the next (N+1)-th frame for passing the next frame video data (FIG. 2A). The aforementioned operation is successively performed, enabling to transfer and display a moving picture video data.

The decision whether transmission of one frame video data is complete can be made by counting a total data amount of the transfer video data by the host computer. Alternatively, it is also possible to add to the end of a video data indicating the end of one frame data transmission.

Next, explanation will be given on the key-in data transmission.

Figure 3:
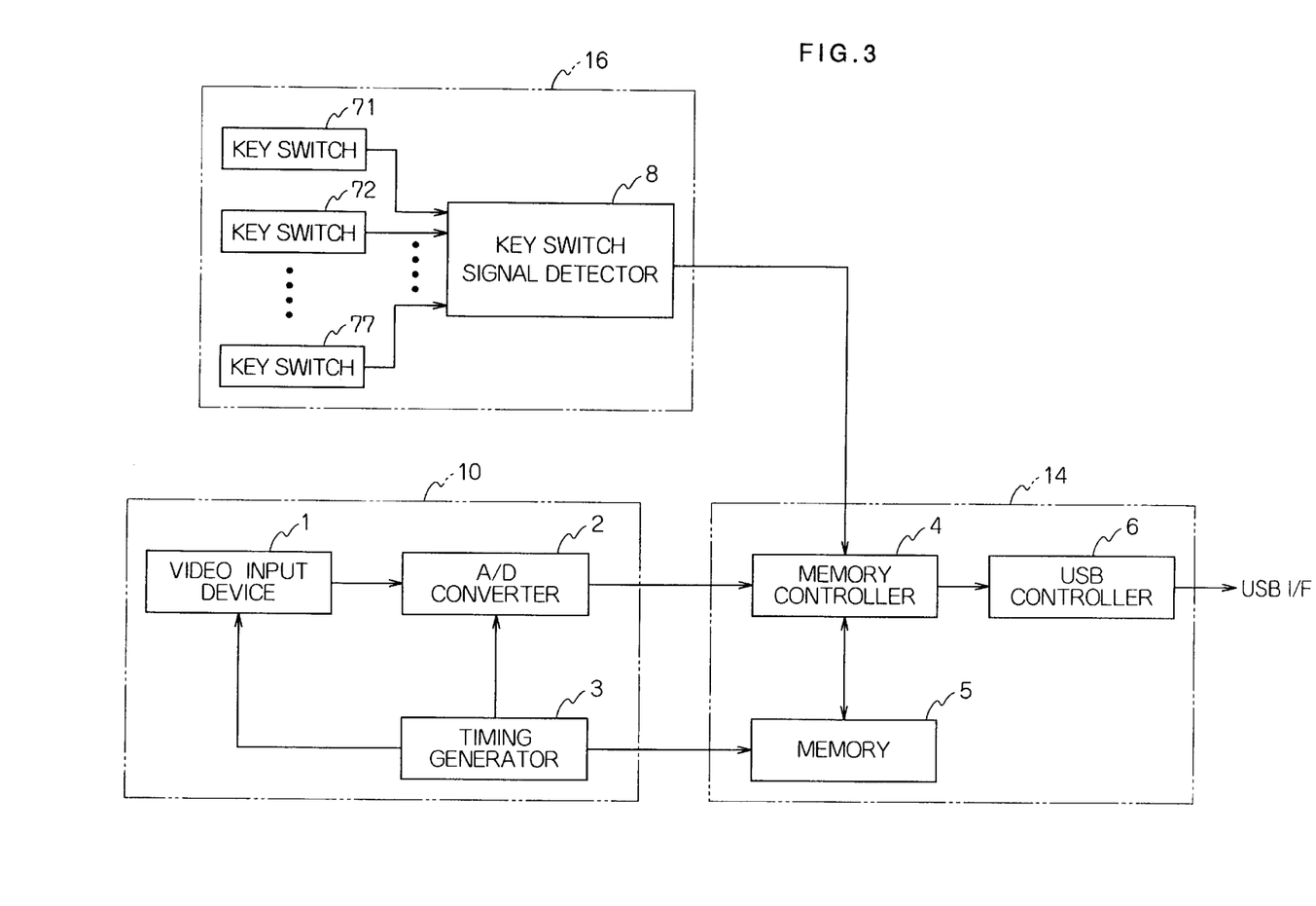
FIG. 3 is a block diagram showing a configuration of the first specific example of FIG. 2.

As shown in FIG. 3, the key-in means 16 includes seven key switches 71 to 77. Various functions are assigned to the respective key switches 71 to 77 provided on the PC camera. The key switch signal detector 8 converts a depressed/non-depressed state of each key into a binary data of '1' (depressed) and '0' (non-depressed) and generates a hexadecimal key-in data as a whole. In this example, the PC camera has the seven key switches 71 to 77 and a key-in data is an 8-bit data, in which each bit is assigned to each of the key switches 71 to 77. It should be noted that this is only an example and there can be considered many other ways for replacing the key switch information with a digital data.

The key switch signal detector 8 outputs a key-in data as follows: 0×00 if none of the key switches 71 to 77 is depressed; 0×01 if the key switch 71 is depressed; 0×02 if the key switch 72 is depressed, . . . , and 0×07 if the key switch 77 is depressed. Thus, the key-in data is constituted by replacing an input signal of the respective key switches 71 to 77 with respective bits of the 8-bit data. The memory controller 4 inserts the key-in data into a part of a video data so that the key-in data is transmitted together with the video data to the USB controller 6. The key-in data may be inserted possibly to various parts of the video data. In this example, it is assumed that the key-in data is inserted at the end of one-frame video data as shown in FIG. 2. This enables to obtain a processing almost at a real time.

The host computer receives the video data having the key-in data transmitted from the PC camera and isolates the video data from the key-in data and performs a processing for the key-in data. The memory controller 4 writes 0×00 as a key-in data at the end of the video data being written if none of the key switches 71 to 77 has been depressed. When the host computer receives 0×00 as the key-in data, decides that none of the key switches 71 to 77 has been depressed and performs a corresponding processing.

For example, when the key switch 71 is depressed, the key switch signal detector 8 decides which of the key switches 71 to 77 has been depressed and sets '1' to the corresponding bit to determine an 8-bit key-in data, which is transmitted to the memory controller 4. The memory controller 4 adds the key-in data received, at the end of the one-screen video data being read out from the memory 5 for transmission to the USB controller 6. This processing may also be performed during a write to the memory 5. The video data having the key-in data added is transmitted from the USB controller 6 via the USB interface to the host computer. The host computer detects that the key switch 71 has been depressed and performs a corresponding processing.

Next, explanation will given on the real time characteristic of the key-in data.

For example, if the key switch 71 is a key having a release function, the PC camera immediately reports the depression of the key switch 71 to the host computer so that the host computer immediately starts a processing to halt the current video display. If this procedure takes much time, the release function is meaningless. If the video data transfer is at a sufficiently high rate, the key-in data transfer is also at a high speed, causing no problem. However, if the video size is large, the one-frame data amount is also large, requiring much transfer time. In such a case, if the report of the key-in data to the host computer is delayed, the processing may not be performed in time.

Here, instead of once adding a key-in data to one-screen video data, it is also possible to add the key-in data to a video data of one packet of the ISO transfer, so that the key-in data can be transferred always almost at a real time regardless of the video data size. However, this requires the host computer to isolate a key-in data and identifies the key-in data for each one packet of the ISO transfer, which requires a considerable time. Moreover, if a key-in data is added at the head of a video data, for example, there is required a time for transferring one-screen video data between the moment the PC camera accepts a key switch depression and the moment the host computer accepts the key-in data.

To solve these problems, in this example, a key-in data is once added to one-screen video data and the key-in data is added at the end of the video data. That is, to accept the latest key-in data in time axis and to immediately perform a necessary processing, the memory controller 4 retains a key-in data transferred from the key switch signal detector 8 until the end of one-screen video data has been transmitted, so that the key-in data is transmitted additionally after the last data has been transmitted. When the host computer has received one-screen video data, immediately isolates a key-in data and starts a necessary processing. Here, if the depression of a release switch is detected, the video data received is discarded so that the preceding video data is continuously displayed until a key-in data for releasing the release switch is accepted. That is, as will be explained later with reference to FIG. 4 and FIG. 5, if the release switch is depressed while a n-th screen video data is transferred, the next display processing and after continuously display the (n–1)-th screen.

It is assumed that a user keeps the release switch depressed for about 100 to 300 ms. The key switch signal detector 8 employs such a mechanism to prevent a chattering that if the key switch is kept depressed for 100 ms after the key switch depression is accepted, it is decided that the key is depressed once. Accordingly, the time laps from the acceptance of the key switch depression to the key-in data transmission from the PC camera is about 100 ms at the shortest. The key-in data transfer speed to the host computer is determined by the video data transfer rate, which in turn is determined by video parameter conditions such as a video frame size.

Next, explanation will be given on the relationship between the video data transfer rate and the key switch depression time.

Figure 4:
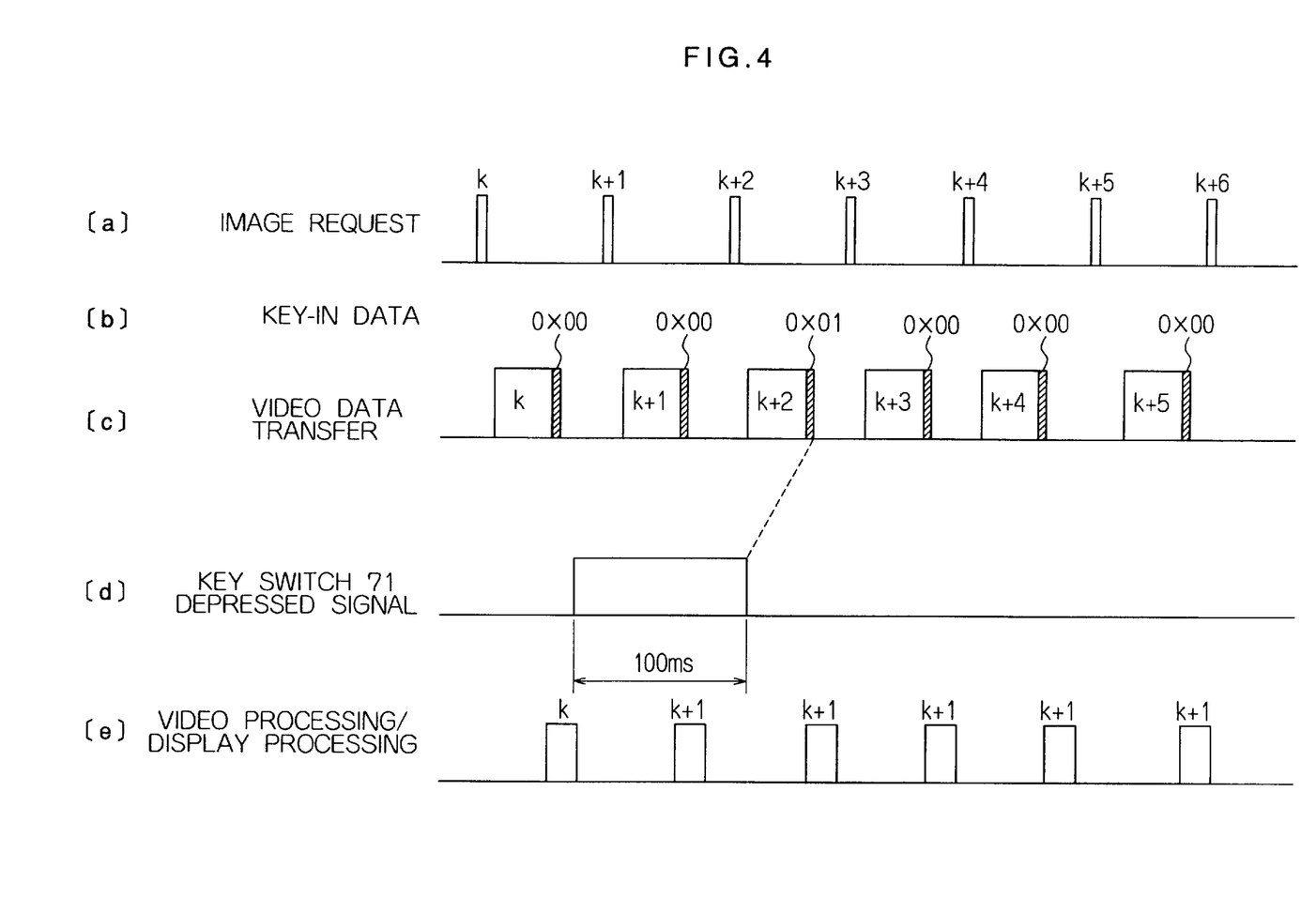
FIG. 4 is a timing chart showing a video signal and a key-in data at a high video transfer rate in the first specific example of FIG. 2

FIG. 4 shows a case when the video frame size is small and during a key switch depression, a video data of a plurality of frames is displayed. In this case, the key-in data is transferred to the host computer at a comparatively high speed. After the release switch is depressed, a plurality of frames are transferred by the time the key-in data is transferred to the host computer. However, if the video data transfer is at a high speed, there will be no actual problem even if there are several frames before the display frame is halted.

Figure 5:
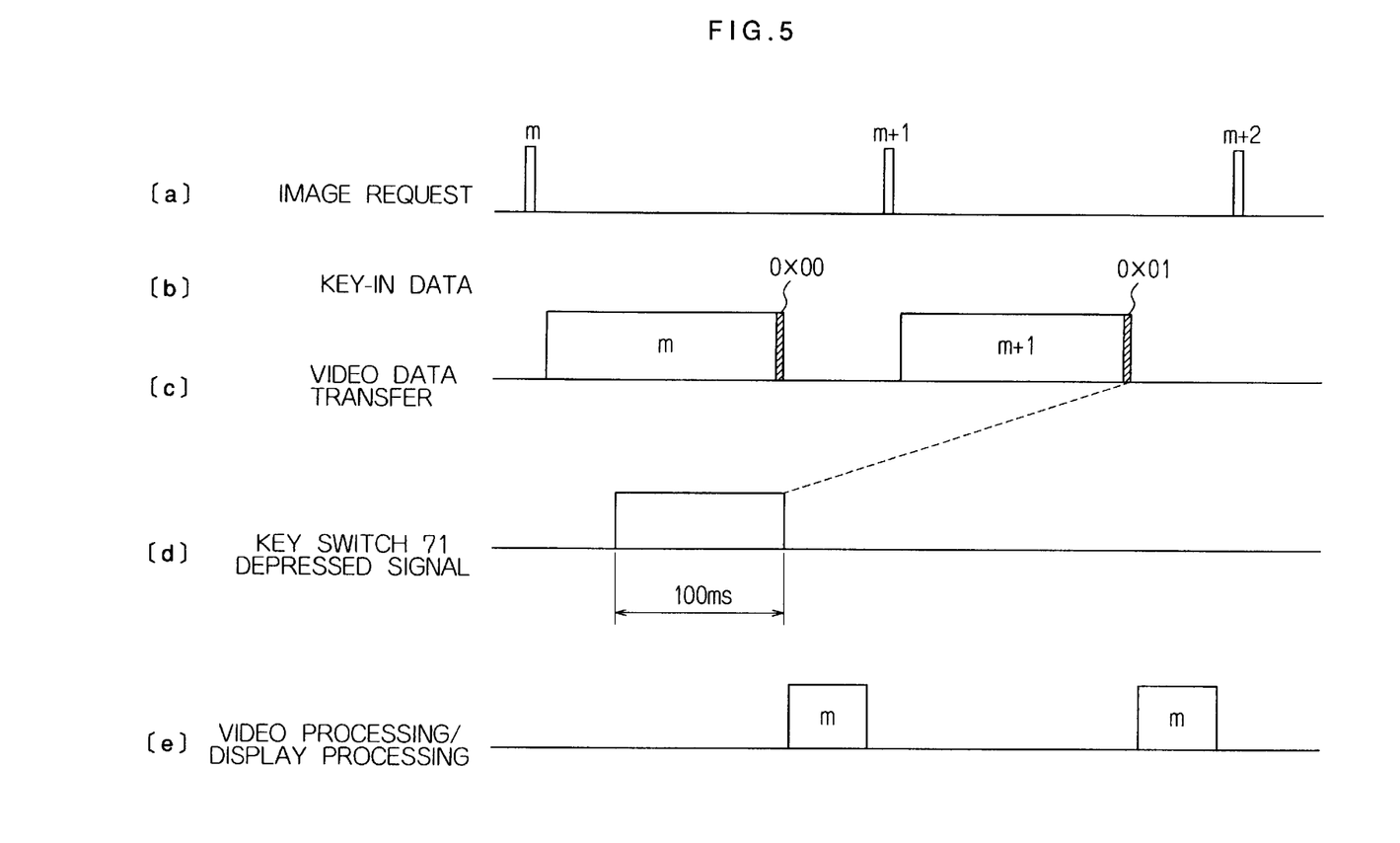
FIG. 5 is a timing chart showing a video signal and a key-in data at a low video transfer rate in the first specific example of FIG. 2.

FIG. 5 shows a case when the video frame size is large and the video data transfer time is long, requiring a considerable time to transfer a key switch signal to the host computer. In this case, the display frame is switched at a low speed. When a key-in data is accepted by the host computer, the display can be halted at a preceding frame. This means that the display has halted at a frame desired by a user of the PC camera.

Thus, the configuration of this example enables to perform a processing for a key-in data almost at a real time.

Figure 6:
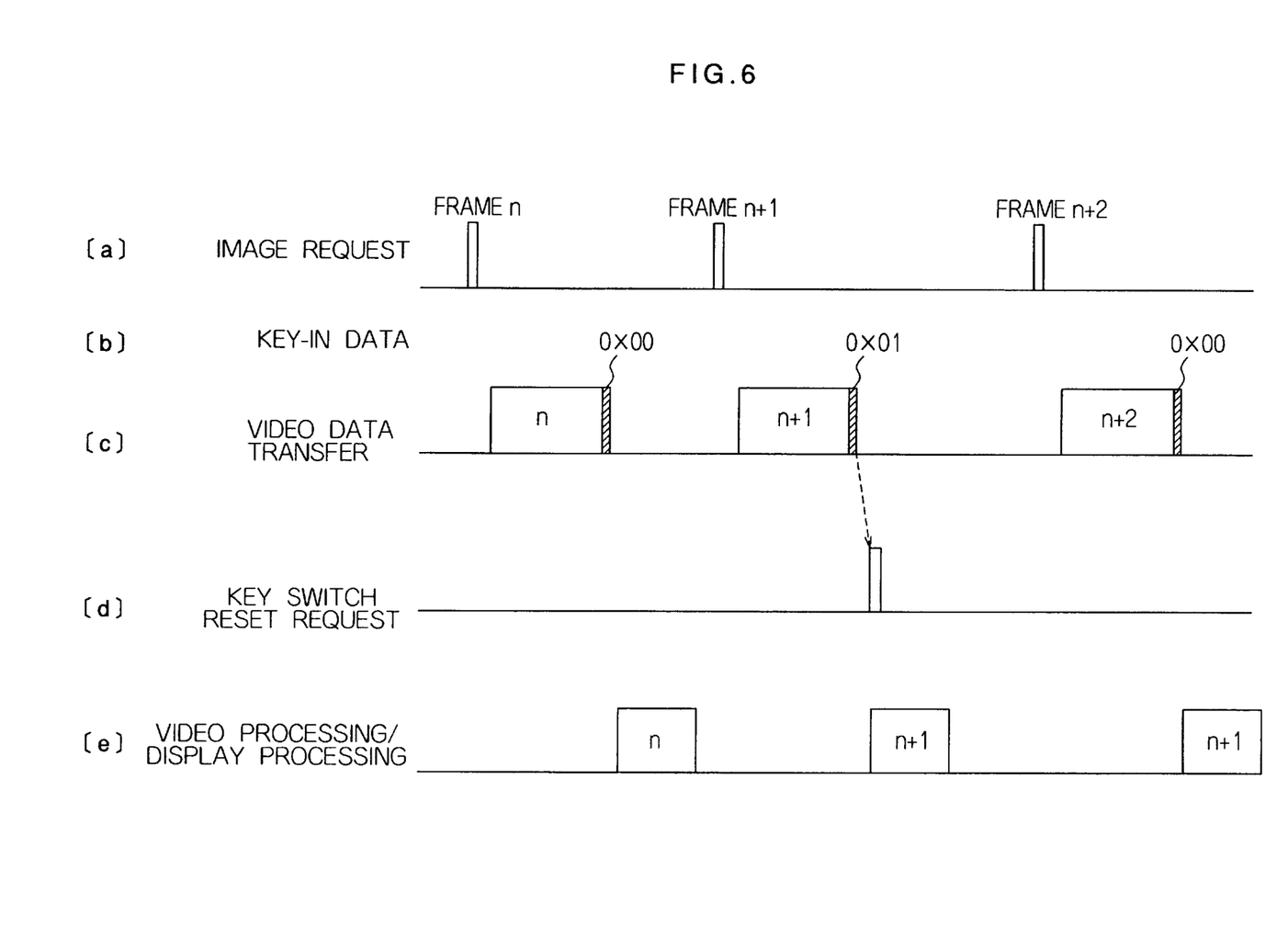
FIG. 6 a timing chart showing a relationship between a key-in data and a reset request in a second specific example of the first embodiment of FIG. 1.

FIG. 6 is a timing chart showing the PC camera operation in a second example of the present embodiment. Note that explanation will be omitted for those parts which are identical as in the first example.

The second example differs from the first example in that there is additionally provided a reset request mechanism as follows. For negotiation between the PC camera and the host computer on whether a key-in data has been accepted, the host computer, upon reception of a key-in data, returns a reset request to the PC camera by way of control transfer. The reset request is constituted by a request by way of a vender-inherent control transfer. The PC camera, upon reception of an input signal from the key switch, repeatedly outputs the key-in data to the host computer. The host computer accepts the key-in data and transfers a reset request to the PC camera. Upon reception of this reset request, the PC camera resets the key-in data, resetting the next key-in data to 0×00. The aforementioned method enables to assure a key-in data transfer between the PC camera and the host computer without causing a transfer error.

As has been described above, the present invention enables to involve a key-in data transfer mechanism in a circuit of a PC camera or the like without complicating the circuit configuration or increasing the circuit size. This is realized by adding a key-in data to a packet of a video data without providing an additional end point for a key-in data transfer.

Moreover, the present invention enables to transfer to a host computer a key-in data of key switches provided on a PC camera or the like at real time without lowering a video data transfer rate. This is based on that a key-in data transfer does not require a separate protocol from the video data transfer. That is, there will not be generated an additional transfer overhead. Furthermore, a key-in data is transferred once per one screen data. This enables to make the processing time short and at real time.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 97-299081 (Filed on Oct. 30$^{th}$, 1997) including specification, claims, drawings and summary are incorporated herein by reference in its entirety.

What is claimed is:

1. A video data reading method comprising steps of:

inputting a video data from a video input device;

inputting a key-in data from a key switch;

retaining said key-in data in a memory controller;

adding, in real-time, said key-in data to a packet of said video data, said packet at the end of one frame of said video data; and transmitting said video data and said key-in data via a USB interface to a host computer.

2. A video data reading method as claimed in claim 1, wherein said host computer, upon reception of said key-in data, returns a request indicating that said key-in data has been recognized.

3. A video data reading apparatus comprising:

a video data input device for inputting a video data;

a key-in device for inputting a key-in data;

a device for retaining said key-in data;

a data output device for adding, in real-time, said key-in data inputted from said device for retaining said key-in data, to a packet of said video data inputted by said video data input device, so that said video data and said key-in data are transferred via a USB interface to a host computer.

4. A video data reading apparatus comprising:

a video input device for reading a moving picture and outputting said moving picture as an analog video signal;

a timing generator for controlling drive of said video data input device;

an A/D converter for converting said analog video signal into a video data consisting of a digital video signal;

a key switch for inputting signals of a user operation and a data input;

a key switch signal detector for converting a signal inputted by said key switch, into a key-in data consisting of a pulse having a predetermined length;

a memory for accumulating said video data;

a memory controller for controlling read-out and write-in of said video data from/into said memory and adding said key-in data to said video data so as to be outputted; and a USB interface for transmitting said video data and said key-in data from said memory controller, in one packet via a USB interface to a host computer.

5. A video data reading apparatus as claimed in claim 3, wherein said host computer, upon reception of said key-in data, returns a request indicating that said key-in data has been recognized.

6. A video data reading apparatus as claimed in claim 4, wherein said host computer, upon reception of said key-in data, returns a request indicating that said key-in data has been recognized.

* * * * *